United States Patent
Trofin et al.

(10) Patent No.: US 10,402,208 B2
(45) Date of Patent: Sep. 3, 2019

(54) ADAPTIVE PORTABLE LIBRARIES

(75) Inventors: Mircea Trofin, Redmond, WA (US); Krzysztof Cwalina, Sammamish, WA (US); Patrick H. Dussud, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 121 days.

(21) Appl. No.: 13/525,356

(22) Filed: Jun. 18, 2012

(65) Prior Publication Data

US 2013/0339928 A1    Dec. 19, 2013

(51) Int. Cl.
  *G06F 9/445*    (2018.01)
  *G06F 8/41*     (2018.01)

(52) U.S. Cl.
  CPC .......... *G06F 9/44521* (2013.01); *G06F 8/423* (2013.01); *G06F 9/44547* (2013.01)

(58) Field of Classification Search
  CPC ... G06F 9/44521; G06F 9/44547; G06F 8/423
  USPC ........................................................ 717/122
  See application file for complete search history.

(56) References Cited

U.S. PATENT DOCUMENTS

| | | | |
|---|---|---|---|
| 5,860,006 A | 1/1999 | Osborne et al. | |
| 6,520,410 B2 * | 2/2003 | Putman et al. | 235/380 |
| 6,983,460 B1 | 1/2006 | Goire et al. | |
| 7,210,132 B2 | 4/2007 | Rivard et al. | |
| 7,275,241 B2 | 9/2007 | Choi et al. | |
| 7,346,849 B1 * | 3/2008 | Mulligan | G06F 8/41 715/763 |
| 7,546,607 B2 | 6/2009 | Demsey et al. | |

(Continued)

FOREIGN PATENT DOCUMENTS

| | | |
|---|---|---|
| JP | H09190355 A | 7/1997 |
| JP | 2000347875 A | 12/2000 |

OTHER PUBLICATIONS

"GoingDeep: .NET 4.5: David Kean and Mircea Trofin—Portable Libraries", Retrieved at <<http://www.developerfusion.com/media/128795/net-45-david-kean-and-mircea-trofin-portable-libraries/>>, Retrieved Date: Feb. 3, 2012, p. 1.

(Continued)

*Primary Examiner* — Emerson C Puente
*Assistant Examiner* — Sen Thong Chen (57) ABSTRACT

Platform-agnostic source code can be augmented with one or more portions of source code annotated for different platforms and/or versions. The source code including both the platform-agnostic and platform-specific and/or version-specific portions can be compiled once to create a single executable that can be distributed to and can run on multiple device platforms and/or multiple versions of one or more platforms. Platform-specific or version-specific executables (e.g., assemblies, binaries, etc.) can be embedded into a binary or executable as resources (e.g., data). When the compiled code is executed on a device, the runtime can extract the platform-specific portion corresponding to the device on which the executable is being run, can bind the extracted portion to the executable and can load and execute the executable. Hence the same binary can produce different results or functionalities depending on the capabilities of the platform on which the binary runs.

20 Claims, 6 Drawing Sheets

(56) References Cited

U.S. PATENT DOCUMENTS

| | | | |
|---|---|---|---|
| 7,945,902 B1 | 5/2011 | Sahoo | |
| 2005/0108694 A1* | 5/2005 | Ramani | G06F 8/427 |
| | | | 717/143 |
| 2006/0080680 A1 | 4/2006 | Anwar et al. | |
| 2007/0169010 A1* | 7/2007 | Garner | G06F 8/10 |
| | | | 717/136 |
| 2009/0249277 A1* | 10/2009 | Prakash | G06F 8/60 |
| | | | 717/100 |
| 2009/0254889 A1 | 10/2009 | Prasadarao | |
| 2011/0067013 A1* | 3/2011 | Frost et al. | 717/148 |
| 2011/0276954 A1 | 11/2011 | Fontenot et al. | |
| 2011/0307869 A1 | 12/2011 | Cwalina et al. | |
| 2013/0219376 A1* | 8/2013 | Nelson | 717/138 |

OTHER PUBLICATIONS

Cha, et al., "Platform-Independent Programs", In Proceedings of the 17th ACM Conference on Computer and Communications Security, Oct. 4, 2010, pp. 12.

"International Search Report & Written Opinion for PCT Patent Application No. PCT/US2013/042791", dated Oct. 22, 2013, Filed Date: May 28, 2013, pp. 10.

"Office Action Issued in Japanese Patent Application No. 2015-518415", dated Sep. 6, 2016, 8 Pages.

"First Office Action and Search Report Issued in Chinese Patent Application No. 201380032264.9", dated Oct. 31, 2016, 16 Pages.

"Office Action Issued in European Patent Application No. 13745208.2", dated Apr. 12, 2017, 5 Pages.

"Notice of Allowance Issued in Chinese Patent Application No. 2015-518415", dated Mar. 2, 2017, 4 Pages.

"Office Action Issued in Japanese Patent Application No. 2015-518415", dated Feb. 1, 2017, 5 Pages.

Chidane, Kikusato, "Explore the Unfathomable Mac World ~Manual for Dissecting Mac ~", In Magazine ASCHII Technologies, ASCHII Media Works, vol. 14, Issue No. 11, Nov. 1, 2009, 11 Pages.

Andoh, Kazumasa, "Linux Report Development Tool", In Magazine Nikkei Linux, Nikkei BP Inc., vol. 13, Issue No. 9 , Aug. 8, 2011, 5 Pages.

"Second Office Action and Search Report Issued in Chinese Patent Application No. 201380032264.9", dated Jul. 4, 2017, 17 Pages.

"Third Office Action Issued in Chinese Patent Application No. 201380032264.9", dated Feb. 1, 2018, 7 Pages.

"Office Action Issued in European Application No. 13745208.2", dated Oct. 29, 2018, 8 Pages.

\* cited by examiner

Prior art

ADAPTIVE PORTABLE LIBRARIES

BACKGROUND

The term "portability" as used in computer science refers to the ability to use the same software in different computing environments. The term "portable code" can be used to refer to code that is not platform-specific. That is, the very same software can run on any platform or at least on multiple platforms. The term "portable code" can also be used to refer to code that can be more cost-effectively changed to run on a different platform than writing the software from scratch. To distinguish these different usages of the same term, the term "universally portable code" will be used to refer to platform-agnostic code that can run on any platform. The term "portable code" will be used to refer to code that can be changed to run on different platforms cost-effectively.

One way to create different versions of code to run on different platforms is by conditional compilation. Conditional compilation enables the compiler to produce multiple different executables associated with multiple different platforms by compiling the code multiple times. The compiler is run with one set of parameters or directives to generate an executable for a first platform and is run with another set of parameters or directives to generate an executable for a second platform and so on.

SUMMARY

Platform-agnostic portions of source code can be augmented to include one or more portions that are annotated for different platforms and/or versions of software. The source code including both the platform-agnostic and platform-specific and/or version-specific portions can be compiled once to create a single executable that can be distributed to and can run on multiple device platforms and/or multiple versions of one or more platforms. Platform-specific attributes of a development environment can enable compilers to provide platform-specific auto-completion and type-checking Platform-specific or version-specific executables (e.g., assemblies, binaries, etc.) can be embedded into universally portable (platform-agnostic) executables as resources (e.g., data). A platform-specific abstraction layer and/or version-specific interface can also be created and can be embedded into the universally portable executable as a resource or data. The platform-specific abstraction layer can be implemented at execution time by a corresponding platform-specific executable. Development tools, for example an IDE (integrated development environment), can set up the executable so that when the executable is executed on a particular device, the executable will execute correctly. When the compiled code is executed on a device, the program execution manager (e.g., runtime) can extract the platform-specific data corresponding to the device on which the executable is being run, can bind the extracted data to the executable and can load and execute the executable. Hence the same binary can produce different results or functionalities depending on the capabilities of the platform on which the binary runs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
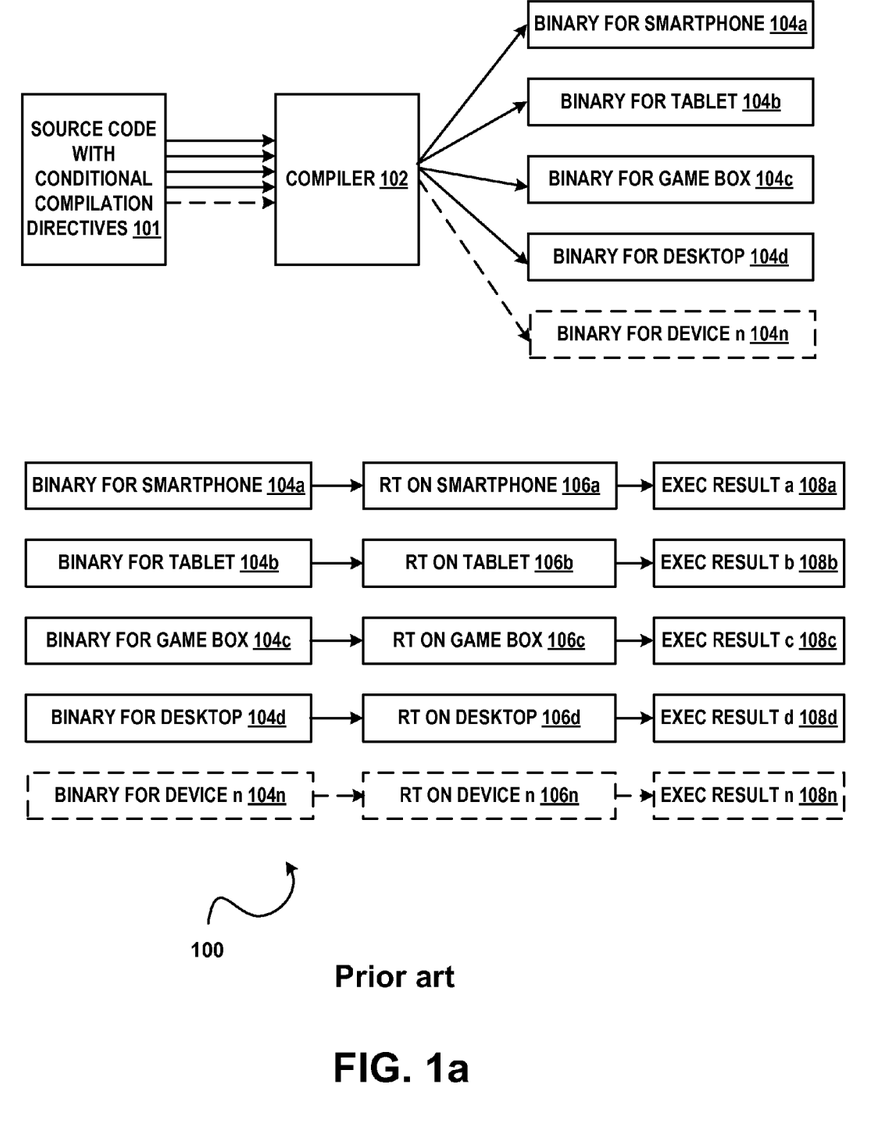
FIG. 1a illustrates an example of a system 100 as known in the art that conditionally compiles portable code.

FIG. 1a illustrates a system for producing universally portable code as is known in the art. Traditionally, source code with conditional compilation directives (such as source code 101) is compiled to run on a target device. For example, source code is compiled on a compiler 102 once to run on a target device such as a smartphone and produces a binary for a smartphone such as a binary for a smartphone 104a. Source code with different directives can be compiled a second time to produce a binary that can run on a tablet (e.g., binary for tablet 104b). Source code with still different directives can be compiled again to produce a binary that can run on a game box (e.g., binary for game box 104c) or desktop (e.g., binary for desktop 104d) or other device (e.g., binary for device n 104n). Thus the portable code is compiled multiple times to produce multiple binaries, each binary designed to run on a particular platform.

One consequence of such a design is that when software is packaged for deployment to a device, the appropriate binary has to be selected for that device. For example, the binary 104a for the smartphone has to be deployed to a smartphone and the runtime of the smartphone 106a will execute the binary 104a to produce some execution result a 108a. Similarly, the binary 104b for the tablet has to be deployed to a tablet and the runtime of the tablet 106b will execute the binary 104b to produce some execution result b 108b which may be different from execution result a 108a. Similarly, the binary 104c for the game box has to be deployed to a game box and the runtime of the game box 106c will execute the binary 104c to produce some execution result c 108c which may be different from execution result a 108a and different from execution result b 108b. The binary 104d for the desktop has to be deployed to a desktop and the runtime of the desktop 106d will execute the binary 104d to produce some execution result d 108d which may be different from execution results of other devices. That is, a device-specific binary 104n has to be deployed to the corresponding device and the runtime of that device 106n will execute the binary 104n to produce particular results 108n. If the code is reused, the code has to be modified to change the device-specific portions.

Figure 1B:
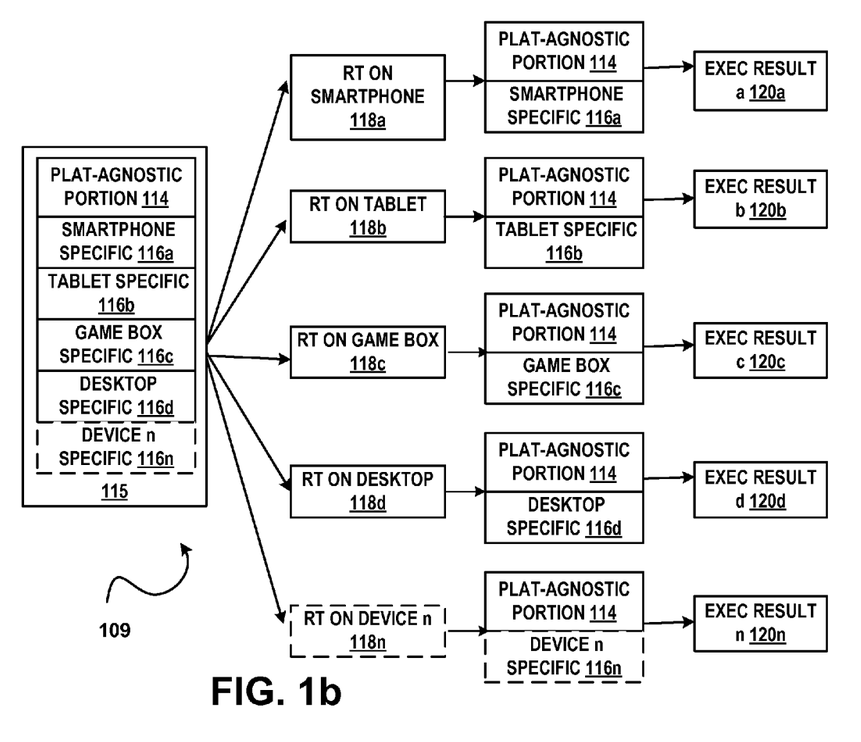
FIG. 1b illustrates an example of a system 109 that generates a single executable that can run on multiple platforms in accordance with aspects of the subject matter disclosed herein.

FIG. 1b illustrates a system 109 that generates a single binary (which can also be called a reference library) in accordance with aspects of the subject matter described herein. In accordance with aspects of the subject matter described herein, source code such as source code 110 can be compiled by a modified compiler 112 once to produce a single binary (e.g., binary 115) that can run on multiple target platforms. A binary as known in the art can include a code portion and a non-code portion representing resources or data. The binary 115 can include one or more portions such as version and/or platform-agnostic portion 114 that comprises version and/or platform-agnostic code and one or more portions that are version-specific and/or platform-specific (e.g., smartphone specific portion 116a, tablet specific portion 116b, game box specific portion 116c, desktop specific portion 116d or any device specific portion n 116n). The platform-specific portions can be labeled as resources or data. The single binary 115 can be deployed to multiple different platforms.

At runtime the binary 115 can be executed by the program execution manager such as but not limited to a runtime (e.g., a runtime 118a for the smartphone, a runtime 118b for the tablet, a runtime 118c for the game box, a runtime 118d for the desktop and in general a runtime 118n for a device n.) The runtime can extract an appropriate (matching) version-specific and/or platform-specific portion of the binary, (e.g., from the portion of the binary labeled as a resource or data) and bind the extracted version-specific and/or platform-specific portion of the binary to the version and/or platform-agnostic portion of the binary. That is for example, the runtime 118a of a smartphone can bind the smartphone specific portion of the binary 116a to the platform-agnostic portion 114 and can execute it to produce an execution result a 120a for the smartphone. Similarly, the runtime 118b of a tablet can bind the tablet specific portion of the binary 116b to the platform-agnostic portion 114 and can execute it to produce an execution result b 120b for the tablet. The runtime 118c of a game box can bind the game box specific portion of the binary 116c to the platform-agnostic portion 114 and can execute it to produce an execution result c 120c for the game box. The runtime 118d of a desktop can bind the desktop specific portion of the binary 116d to the platform-agnostic portion 114 and can execute it to produce an execution result d 120d for the desktop. Similarly, the runtime 118n of a particular device can bind the device specific portion of the binary 116n to the platform-agnostic portion 114 and can execute it to produce an execution result n 120n for the device.

Likewise version-specific and/or platform-specific platform abstraction layers (not shown in FIG. 1b) can be extracted from the data portion of the binary and can be bound to the version-specific and/or platform-agnostic portion 114. In accordance with some aspects of the subject matter described herein, the single binary 115 is produced in such a way that the one or more version-specific and/or platform-specific portions of the code are understood by the runtime as normal units of re-use (e.g., the binary is created in a format that the runtime recognizes).

Adaptive Portable Libraries

Figure 1C:
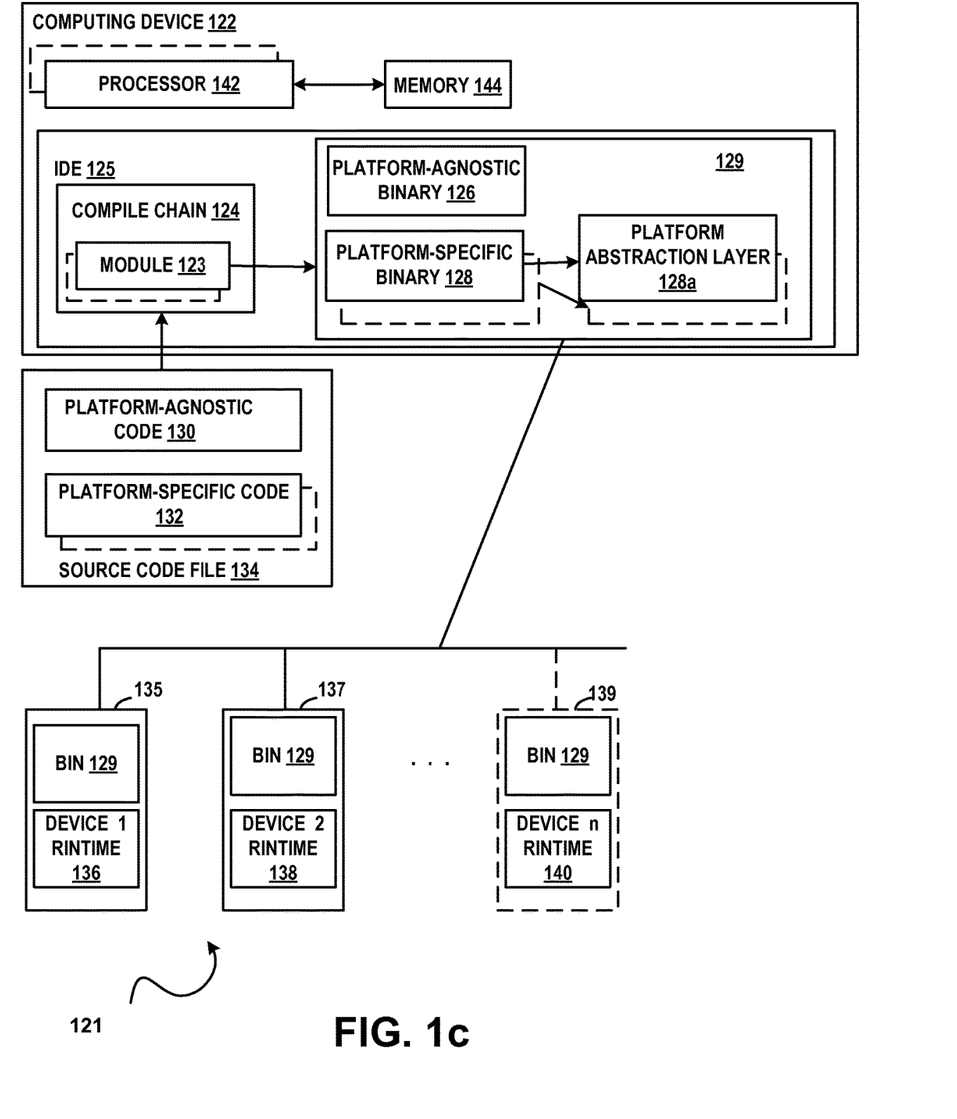
FIG. 1c illustrates an example of a system 121 that generates a single executable that can run on multiple platforms in accordance with aspects of the subject matter disclosed herein.

FIG. 1c illustrates a block diagram of a system 121 that generates a single portable executable in accordance with aspects of the subject matter disclosed herein. FIG. 1c also illustrates execution of the portable executable in accordance with aspects of the subject matter described herein. All or portions of system 121 may reside on one or more computers or computing devices such as the computers described below with respect to FIG. 3. System 121 or portions thereof may be provided as a stand-alone system or as a plug-in or add-in. System 121 may execute in whole or in part on a software development computer such as the software development computer described with respect to FIG. 4. All or portions of system 121 may be operated upon by development tools. For example, all or portions of system 121 may execute within an integrated development environment (IDE) such as for example, IDE 125, described more fully with respect to FIG. 4 or can execute outside an IDE.

System 121 may include one or more computing devices or computers such as computing device 122. Computing device 122 can include one or more processors such as processor 142, etc., a memory such as memory 144, and one or more modules such as module 123 that generate a single universally portable executable. The one or more modules represented by module 123 can comprise a part of a compilation chain 124. Module 123 can be a part of a compiler or a compiler pre-processor or a compiler post-processor or any combination thereof. It will be appreciated that one or more modules such as module 123, etc. can be loaded into memory 144 to cause one or more processors such as processor 142, etc. to perform the actions attributed to the module 123.

System 121 may include one or more other computers or computing devices including but not limited to a smartphone, a tablet, a desktop computer, a game box or any kind of computing device. Each of these computing devices may include one or more processors (not shown), a memory (not shown) and other components well-known in the arts.

A source code file such as source code file 134 may include one or more portions of platform-agnostic code such as platform-agnostic code 130. Source code file 134 may also include one or more portions of platform-specific code such as platform-specific code 132, etc. The one or more portions of platform-specific code can comprise code that is specific for running on a device such as device 1 135, device 2 137 . . . device n 139 and so on. Devices such as device 1 135, device 2 137 . . . device n 139 can include devices such as a smartphone, a tablet, a game box, a desktop computer, a laptop computer, a notebook computer or any other computing device now known or created in the future. The one or more portions of version-specific and/or platform-specific code can be annotated with identifying annotations that indicate the version and/or the type of device for which it is specific. For example, a first annotation or type of annotation can denote that the annotated section of program source code is specific for a smartphone or for a version of software for the smartphone. A second annotation or type of annotation can denote that the annotated section of program source code is specific for a tablet or for a version of software for the tablet and so on. The particular annotations used may control which compiler or version of compiler that is used to create the binary.

Module 123 may receive source code file 134 and in combination with other components of the compile chain 124 can create a single binary 129 that includes one or more portions of version-agnostice and/or platform-agnostic code such as platform-agnostic binary 126 and one or more portions of version-specific and/or platform-specific code such as, for example, platform-specific binary 128, etc. The version-specific and/or platform-specific binary 128 can include "light-up code". Light-up code can comprise one or more features that exist in one platform or version but do not exist in another platform or version and thus "lights up" in a user interface in one platform or version but does not "light up" in a user interface for another platform or version. Version-specific and/or platform-specific binaries such as, for example, platform-specific binary 128, etc. can be designated as resources such as data associated with platform-agnostic binary 126. Module 123, etc. may also generate an abstraction layer (e.g., a platform-specific interface) for each type of platform-specific code portion encountered, based on the code associated with that platform. For example, a first platform-specific binary such as platform-specific binary 128 may be associated with a first platform-specific abstraction layer such as abstraction layer 128a and so on. Alternatively, source code can be compiled multiple times using standard conditional compilation techniques to produce multiple platform-specific binaries that can be combined in a post-compilation operation to create a single multi-platform binary.

The same binary, e.g., binary 129 can be deployed to multiple different platforms. When the software is executed on the device to which it has been deployed, the runtime of the device (e.g., runtime 136, runtime 138 or runtime 140, etc.) can use the appropriate platform-specific binary, binding it to the platform-agnostic binary to create an executable that runs on the device. For example, suppose a platform-agnostic binary, binary A uses a platform-specific binary, binary B. At execution time, the platform-specific binary B appropriate for the device can be selected by the runtime to bind with binary A and the resulting executable can then be executed. It will be appreciated that in addition to different platforms, different versions can be similarly accommodated. The appropriate platform abstraction layer for the platform can be implemented by the runtime based on the platform-specific code selected at binding time. It will be appreciated that although described within the context of a managed language in a virtual machine environment, the concepts described herein can be applied in a native code environment. In a native code environment, platform-agnostic code can be more difficult to create.

Figure 2:
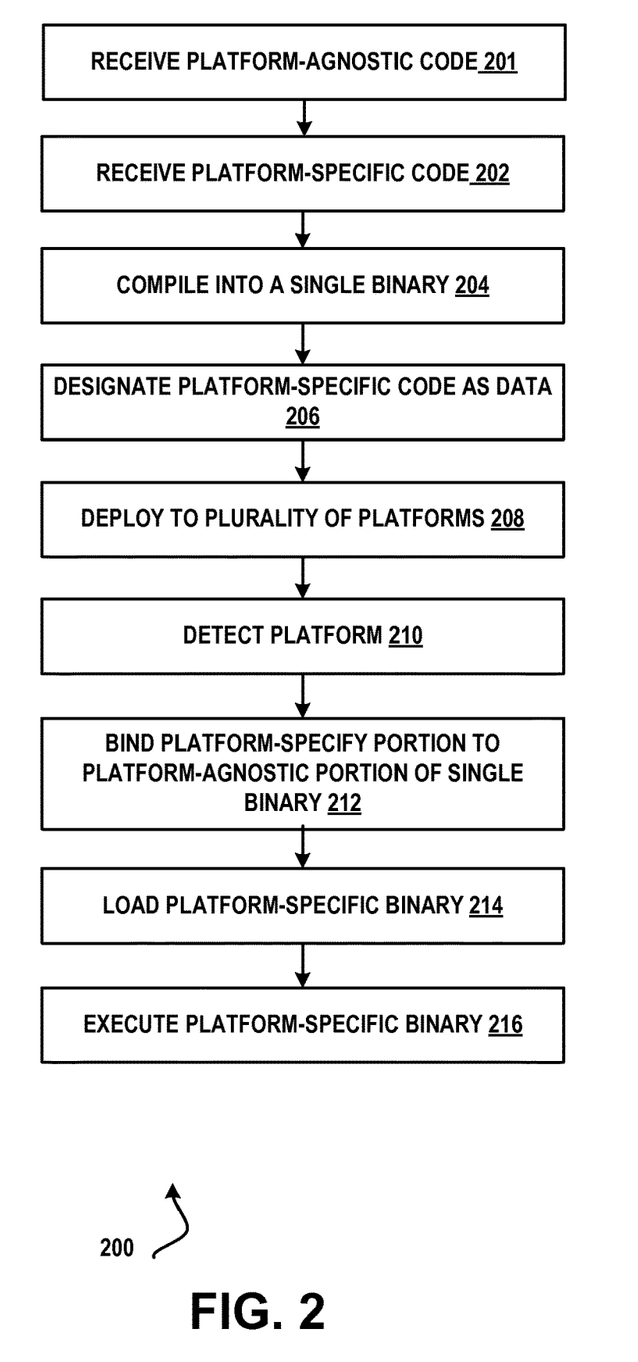
FIG. 2 illustrates an example of a method 200 for generating a single executable and executing the generated executable in accordance with aspects of the subject matter disclosed herein.

FIG. 2 illustrates a method 200 that can create a single binary that can run on multiple different platforms. The binary can be deployed to one or more different platforms. When the binary is executed, the runtime of the device on which the binary has been deployed can determine the appropriate platform-specific binary, extract the appropriate platform-specific binary and can bind it to produce a platform-specific binary for the device. Hence the same binary can produce different results when run on different devices. The method described in FIG. 2 can be practiced by a system such as but not limited to the one described with respect to FIGS. 1b and 1c. While method 200 describes a series of operations that are performed in a sequence, it is to be understood that method 200 is not limited by the order of the sequence. For instance, some acts may occur in a different order than that described. In addition, an act may occur concurrently with another act. In some instances, not all acts may be performed. Moreover, it will be appreciated that although described with respect to different platforms, the operations describe below apply similarly to creation, generation, deployment and execution of different versions of software as well.

At operation 201 platform-agnostic source code can be received by a source code editor of an IDE or other software tool. At operation 202, source code that has been annotated can be received. Source code that is platform-specific can be annotated so as to identify the platform for which the source code is intended. At operation 204 the source code including both one or more platform-agnostic portions and one or more platform-specific portions can be compiled into a single binary. At operation 206 the platform-specific portions of the binary can be appended to the platform-agnostic binary labeled or designated as data or non-code resources. At operation 208 the binary can be deployed to one or more different platforms. At operation 210 the runtime of one of the devices to which the binary has been deployed can receive a request to execute the binary. The runtime can determine and extract the appropriate platform-specific portion to bind to the platform-agnostic binary. At operation 212 the extracted platform-specific portion can be bound to the platform-agnostic binary. At operation 214 the binary can be loaded and at 216 the binary can be executed.

Example of a Suitable Computing Environment

Figure 3:
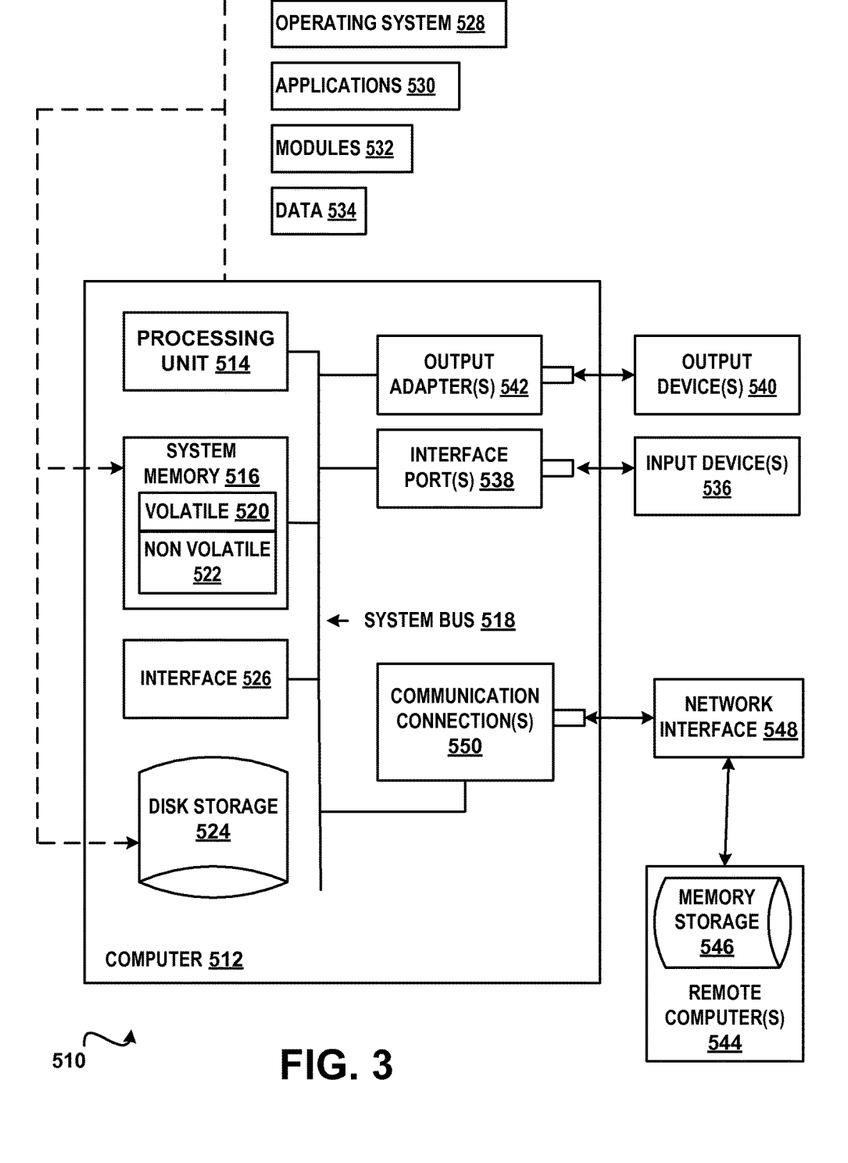
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include transitory media such as, but not limited to, communications signals, modulated carrier waves or any other transitory media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
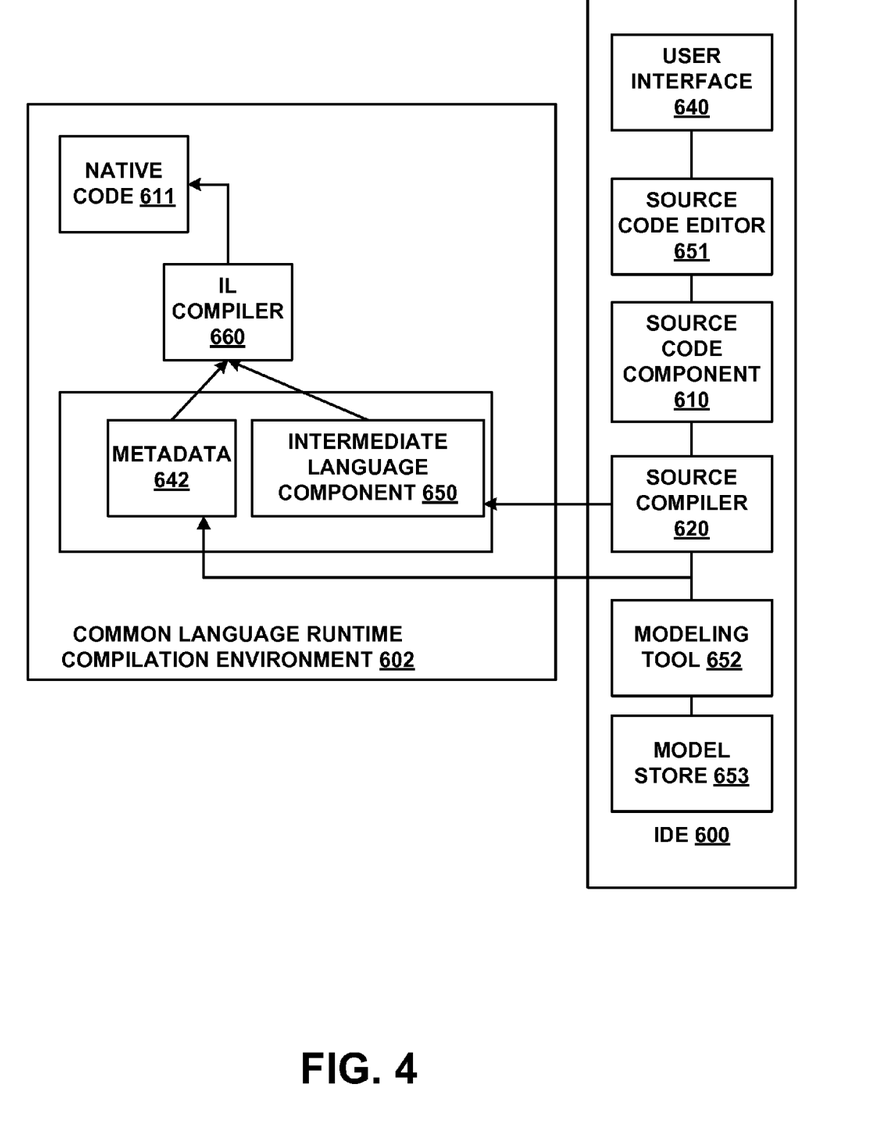
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft.NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory communicably coupled to the at least one processor of the computing device; and
   at least one module loaded into the memory causing the at least one processor to:
      receive a platform-agnostic portion of a source code;
      receive a plurality of platform-specific portions of the source code for different platforms;
      compile the platform-agnostic portion of source code and the plurality of platform-specific portions of source code into a single executable, the single executable including a code portion and a non-code portion, wherein the compiled plurality of platform-specific portions are part of a non-code portion of the single executable and the compiled platform-agnostic portion is part of a code portion of the single executable, the code portion of the single executable separate from the non-code portion of the single executable; and
      deploy the single executable to a plurality of different platforms.

2. The system of claim 1, wherein at least one platform specific portion of the plurality of platform specific portions of the source code includes an annotation indicating a corresponding type of device or version.

3. The system of claim 1, wherein the plurality of platform-specific portions of code, designated as resources are compiled into a single universally portable binary.

4. The system of claim 1, wherein the computing device is a smartphone, tablet, game box, desktop computer or notebook.

5. The system of claim 1, further comprising at least one module that when loaded into the memory causes the at least one processor to generate a platform-specific abstraction layer.

6. The system of claim 5, wherein the platform-specific abstraction layer is an interface.

7. The system of claim 1, wherein a platform-specific portion of the plurality of platform-specific portions of source code comprises a version of software.

8. The system of claim 1, wherein annotations in the source code determine a compiler that compiles the platform-agnostic portion of the source code and the plurality of platform-specific portions of the source code into the single executable.

9. A method comprising:
   receiving by a processor of a computing device a single executable including a code portion and a non-code portion, the code portion comprising platform-agnostic code, the non-code portion including a plurality of platform-specific code, the code portion of the single executable separate from the non-code portion of the single executable;
   determining a platform of the processor of the computing device, the platform of the processor comprising a first platform;
   extracting from the non-code portion of the single executable, the platform-specific code for the first platform;
   binding the platform-specific code for the first platform to the platform-agnostic code; and
   loading the bound binary.

10. The method of claim 9, wherein the first platform comprises a smartphone, a tablet, a game box, a desktop computer or a notebook.

11. The method of claim 9, further comprising:
    receiving the single executable comprising a plurality of platform-specific platform abstraction layer portions, the plurality of platform-specific platform abstraction layer portions comprising a platform-specific platform abstraction layer for the first platform and a platform specific platform abstraction layer for a second platform.

12. The method of claim 11, further comprising:
    extracting from the plurality of platform-specific platform abstraction layer portions of the single executable, the platform-specific platform abstraction layer for the first platform;
    binding the platform-specific platform abstraction layer portion for the first platform to the platform-agnostic code of a binary; and
    loading the bound binary.

13. The method of claim 9, wherein the single executable comprises a code portion and a non-code portion labeled as data.

14. The method of claim 13, wherein the platform-specific portions of code are placed in the non-code portion of the single executable labeled as data.

15. The method of claim 9, wherein the platform-specific portion comprises a version of software.

16. A device, comprising:
    at least one processor and a memory;
    the at least one processor configured to:
       receive by a processor of a computing device a single executable comprising a code portion and a non-code portion, the code portion of the single executable separate from the non-code portion of the single executable, the code portion of the single executable comprising a platform-agnostic code and the non-code portion of the single executable comprising a plurality of platform-specific portions of code;
       determine a platform of the computing device, the platform of the computing device comprising a first platform;

extract from the plurality of platform-specific portions of code, the platform-specific portion of code for the first platform;

bind the platform-specific portion for the first platform to the platform-agnostic portion of a binary; and load the bound binary.

17. The device of claim 16, wherein the at least one processor is further configured to:

implement a platform-specific abstraction layer.

18. The device of claim 16, wherein the at least one processor is further configured to:

determine a platform-specific portion of code for the first platform, the platform-specific portion of code includes a version of software.

19. The device of claim 16, wherein the at least one processor is further configured to:

extract a platform-specific portion of code for the first platform from the non-code portion of the single executable, the platform-specific portion of code comprising a platform-specific platform abstraction layer.

20. The device of claim 19, wherein the at least one processor is further configured to:

bind the extracted platform-specific platform abstraction layer to the binary.

* * * * *